United States Patent
Vinton

(10) Patent No.: US 9,283,921 B2
(45) Date of Patent: Mar. 15, 2016

(54) DRIVER AIRBAG MODULE HAVING MULTIPLE DEPLOYMENT PATHS

(71) Applicant: FORD GLOBAL TECHNOLOGIES, LLC, Dearborn, MI (US)

(72) Inventor: Jeff S. Vinton, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 54 days.

(21) Appl. No.: 14/086,201

(22) Filed: Nov. 21, 2013

(65) Prior Publication Data

US 2015/0137489 A1 May 21, 2015

(51) Int. Cl.
*B60R 21/203* (2006.01)
*B60R 21/2346* (2011.01)
*B60R 21/26* (2011.01)
*B60R 21/239* (2006.01)

(52) U.S. Cl.
CPC ........... *B60R 21/2346* (2013.01); *B60R 21/203* (2013.01); *B60R 21/239* (2013.01); *B60R 2021/26094* (2013.01)

(58) Field of Classification Search
CPC ..................... B60R 21/203; B60R 2021/26094
USPC .................................................. 280/731, 740
See application file for complete search history.

(56) References Cited

U.S. PATENT DOCUMENTS

| | | | |
|---|---|---|---|
| 5,253,892 A * | 10/1993 | Satoh | B60R 21/233 280/731 |
| 6,149,188 A * | 11/2000 | Simpson et al. | 280/731 |
| 6,918,868 B2 * | 7/2005 | Vitet | 493/457 |
| 7,481,455 B2 * | 1/2009 | Iida et al. | 280/743.1 |
| 7,648,166 B2 * | 1/2010 | Maripudi | 280/740 |
| 7,726,685 B2 * | 6/2010 | Abe et al. | 280/736 |
| 7,845,681 B2 * | 12/2010 | Abe et al. | 280/743.1 |
| 7,988,193 B2 * | 8/2011 | Choi | B60R 21/2035 280/730.1 |
| 8,308,191 B2 * | 11/2012 | Hiruta et al. | 280/736 |
| 2003/0151233 A1 * | 8/2003 | Varcus | 280/729 |
| 2005/0121889 A1 * | 6/2005 | Enders et al. | 280/731 |
| 2005/0206141 A1 * | 9/2005 | Ishikawa et al. | 280/731 |
| 2006/0113776 A1 * | 6/2006 | Iida | B60R 21/233 280/731 |
| 2006/0249939 A1 * | 11/2006 | Maripudi | 280/740 |
| 2009/0020991 A1 * | 1/2009 | Abe et al. | 280/739 |
| 2011/0115202 A1 * | 5/2011 | Hiruta et al. | 280/741 |

FOREIGN PATENT DOCUMENTS

| | | |
|---|---|---|
| EP | 1167128 A2 | 1/2002 |
| EP | 1273486 A2 | 1/2003 |
| EP | 1439097 B1 | 8/2009 |

* cited by examiner

*Primary Examiner* — Karen Beck
(74) *Attorney, Agent, or Firm* — Frank A. MacKenzie; Brooks Kushman P.C.

(57) ABSTRACT

An exemplary driver airbag module may include an inflatable cushion having a chamber that inflates up to a maximum volume. The airbag module may also have a fabric diffuser disposed within the chamber. The inflatable cushion and the fabric diffuser can be configured to deploy at least a portion of the inflatable cushion forward of a steering wheel in response to an out-of-position occupant preventing rearward expansion of the inflatable cushion up to the maximum volume.

6 Claims, 5 Drawing Sheets

DRIVER AIRBAG MODULE HAVING MULTIPLE DEPLOYMENT PATHS

BACKGROUND

Car manufacturers are investigating airbag modules to reduce loading forces on the chin and neck and punch-out forces on the chest of out-of-position occupants. These forces may be reduced by folding the main cushion in a configuration tuned to the particular vehicle carrying the module. However, the folding technique may cause undesirable changes for belted or in-position occupant responses in full vehicle test modes. Moreover, modifications to folding techniques tuned for particular vehicles can require somewhat extensive retesting and significant related costs.

It would therefore be desirable to provide a driver airbag module that provides low risk deployment (LRD) for both in-position and out-of-position occupants.

SUMMARY

An exemplary driver airbag module may include an inflatable cushion having a chamber that inflates up to a maximum volume. The airbag module may also have a fabric diffuser disposed within the chamber. The inflatable cushion and the fabric diffuser can be configured to deploy at least a portion of the inflatable cushion forward of a steering wheel in response to an out-of-position occupant preventing the inflatable cushion to expand rearward and inflate to the maximum volume.

An exemplary passenger restraint system for a vehicle may include a steering column surrounded by a shroud. The system may further have a steering wheel rotatably coupled to the steering column, and an airbag module coupled to the steering column. The airbag module can include an inflatable cushion that has a chamber inflatable up to a maximum volume, and a fabric diffuser that is disposed within the chamber. The inflatable cushion and the fabric diffuser may be configured to deploy at least a portion of the inflatable cushion forward of a steering wheel in response to an out-of-position occupant preventing the inflatable cushion to expand rearward and inflate to its maximum volume.

DETAILED DESCRIPTION

Figure 1:
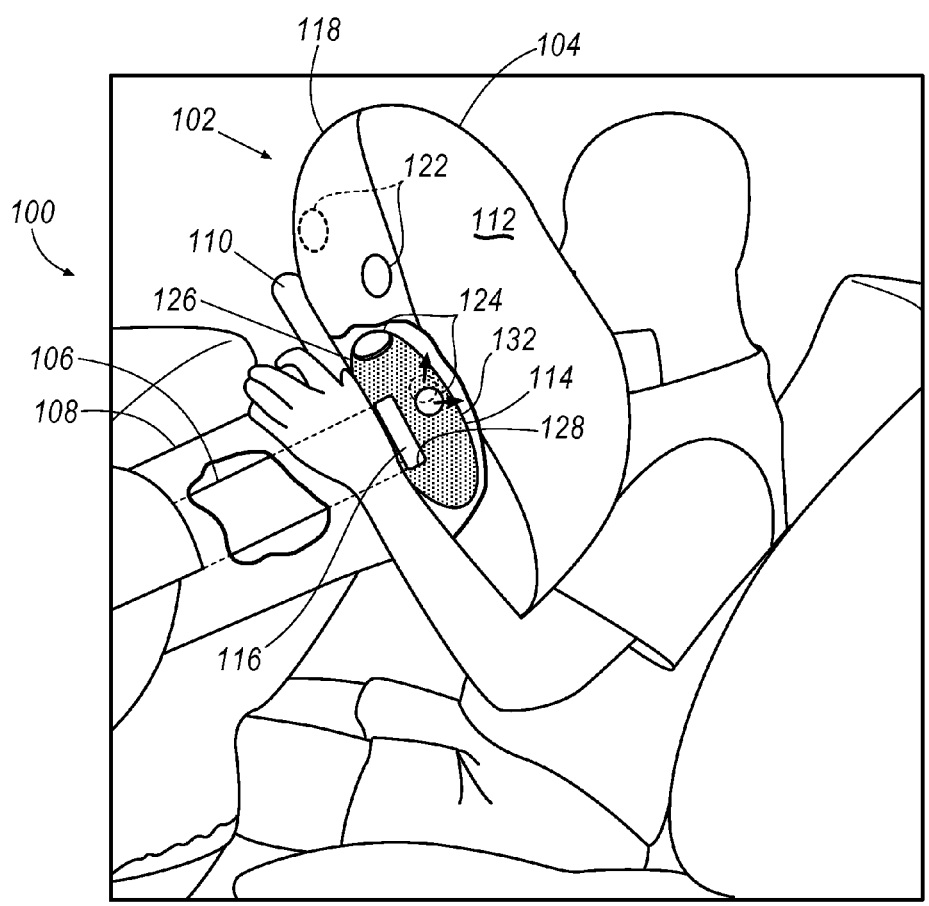
FIG. 1 is a perspective view of an exemplary passenger restraint system having a driver airbag module that includes an inflatable cushion with an upper portion deployed rearward of the steering wheel for an in-position fifth percentile unbelted occupant.

Referring now to the discussion that follows and also to the drawings, illustrative approaches are shown in detail. Although the drawings represent some possible approaches, the drawings are schematic in nature and thus not drawn to scale, with certain features exaggerated or removed to better illustrate and explain the present disclosure. Further, the descriptions set forth herein are not intended to be exhaustive or otherwise limit or restrict the claims to the precise forms and configurations shown in the drawings and disclosed in the following detailed description.

Referring to FIGS. 1-4, an exemplary passenger restraint system 100 ("system") may include a driver airbag module 102 ("airbag module") having an inflatable cushion 104 with multiple deployment paths to reduce forces on the chin, neck and chest for both out-of-position occupants and belted occupants. This system 100 further includes a steering column 106 surrounded by a shroud 108, with a steering wheel 110 rotatably coupled to the steering column 106. The airbag module 102 may be coupled to the steering column 106 and have an inflatable cushion 104, which has a chamber 112 that inflates up to a maximum volume. Moreover, the airbag module 102 may also have a fabric diffuser 114, which is disposed within the chamber 112 and directs gas from an inflator device 116 to the cushion 104 so as to provide the multiple deployment paths.

Figure 2:
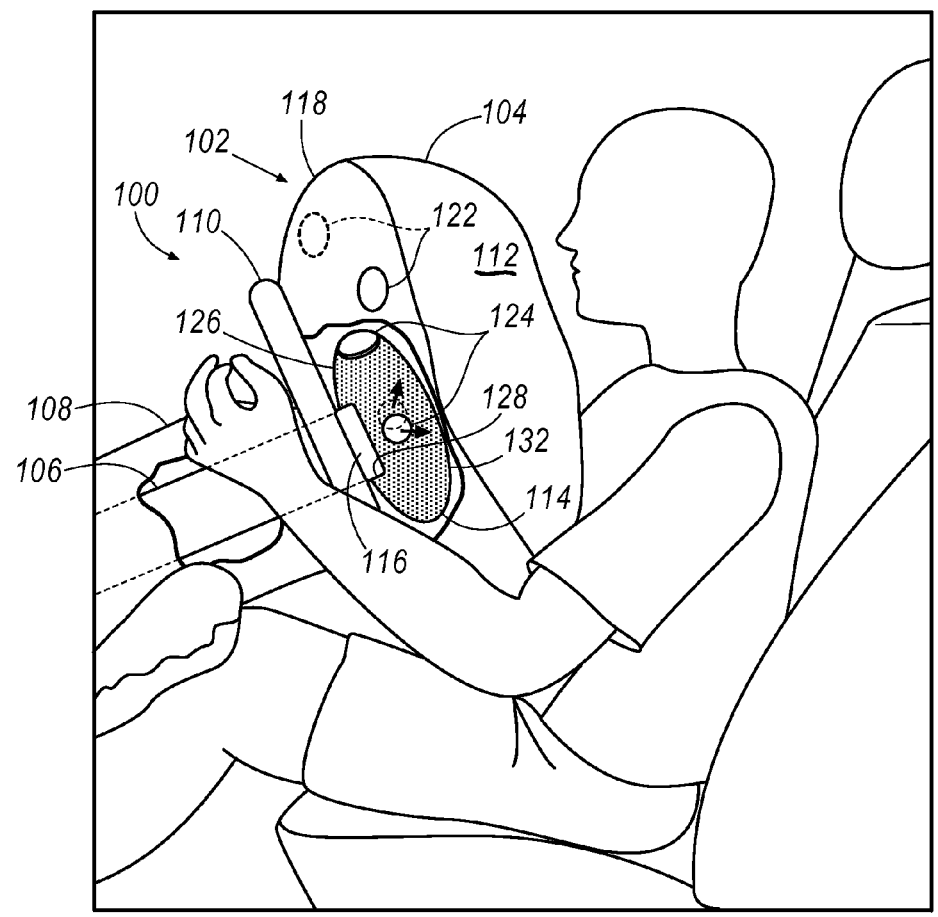
FIG. 2 is a perspective view of the system of FIG. 1, showing the upper portion of the cushion deployed rearward of the steering wheel for an in-position fiftieth percentile unbelted occupant.
Figure 3:
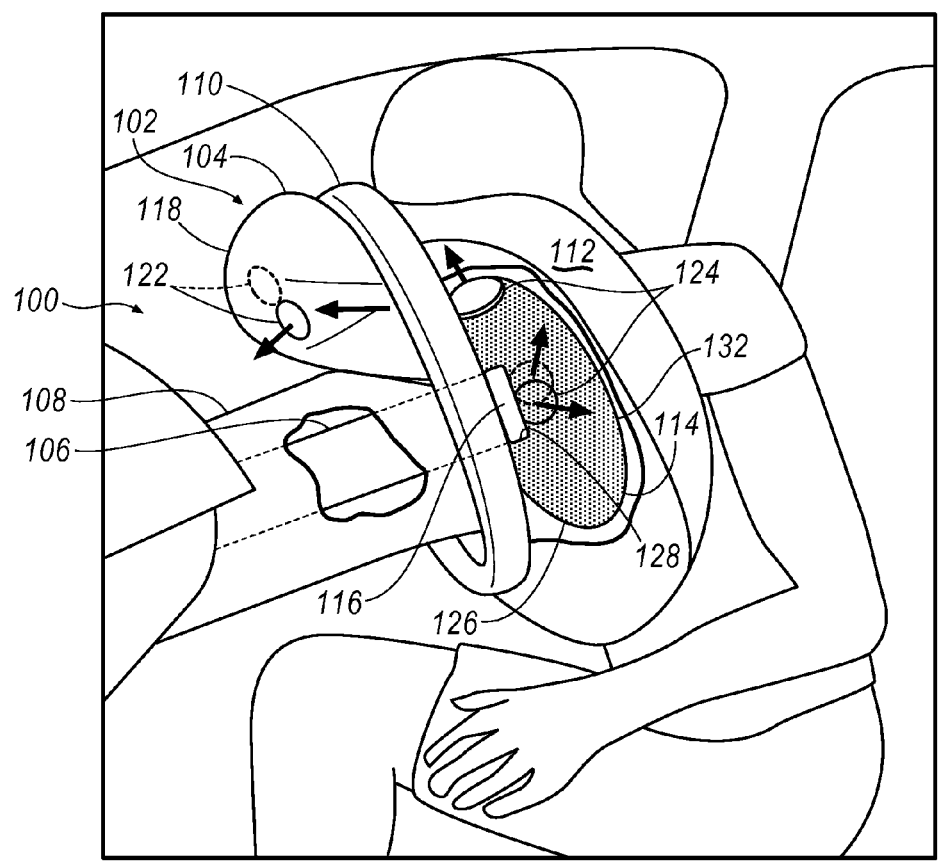
FIG. 3 is a perspective view of the system of FIG. 1, showing the upper portion of the cushion deployed forward of the steering wheel for a fifth-percentile out-of-position occupant and a chin-on-module condition.
Figure 4:
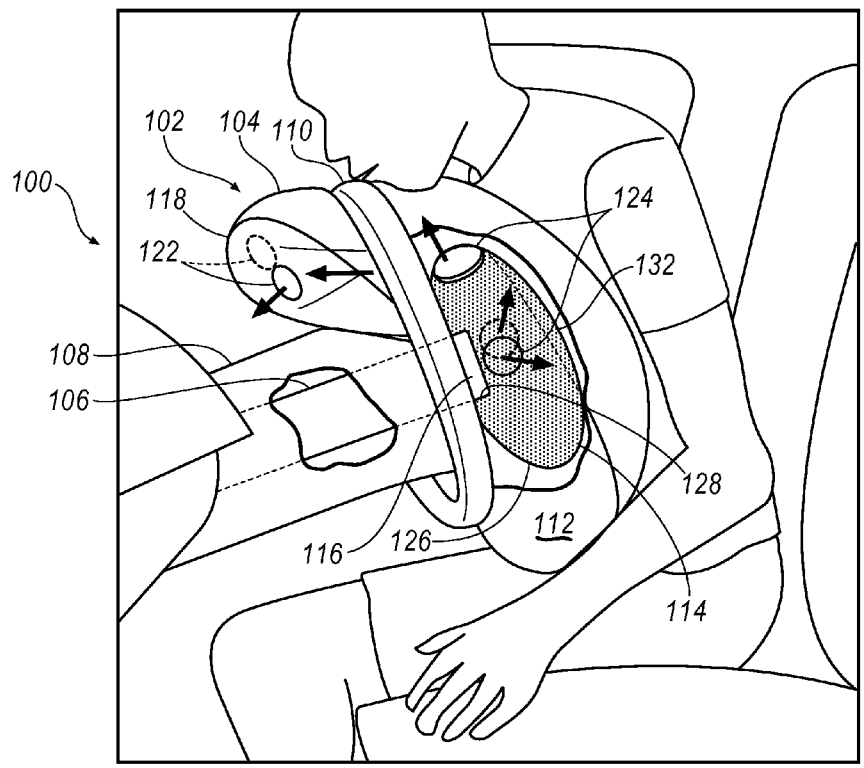
FIG. 4 is a perspective view of the system of FIG. 1, showing the upper portion of the cushion deployed forward of the steering wheel for a fifth-percentile out-of-position occupant and a chin-on-rim condition.
Figure 5:
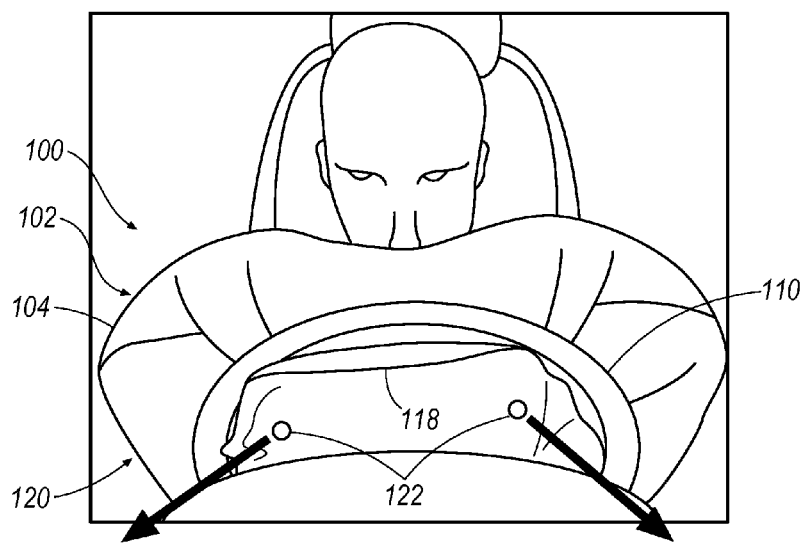
FIG. 5 is a front view of the system of FIG. 3, showing the upper portion of the cushion having vent holes to exhaust gas from the airbag.

As shown in FIGS. 1 and 2, the diffuser 114 and the cushion 104 may be configured such that an upper portion 118 of the cushion 104 deploys rearward of the steering wheel 110 for a fifth-percentile in-position occupant and a fiftieth-percentile in-position occupant. However, the upper portion 118 of the cushion 104 may inflate rearward of the steering wheel 110 for belted occupants of other sizes. Furthermore, as shown in FIGS. 3-5, the diffuser 114 and the cushion 104 may be configured such that the upper portion 118 of the cushion 104 deploys forward of the steering wheel 110 for chin-on-module and chin-on-rim conditions for fifth percentile occupants. However, the cushion 104 may deploy forward of the steering wheel 110 for all other dynamic testing and crash conditions associated with in-position or out-of-position occupants.

Figure 6:
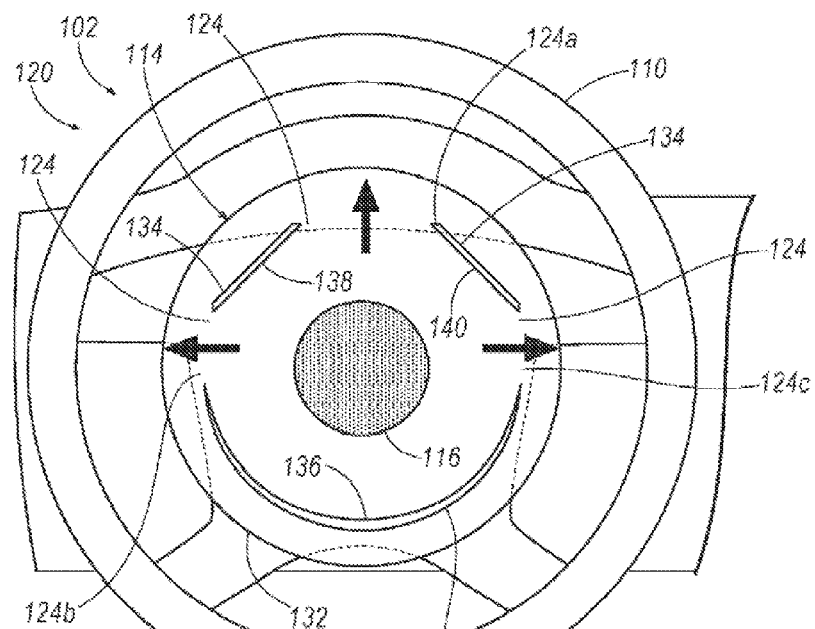
FIG. 6 is a rear view of a non-pressurized fabric diffuser for the driver airbag module of FIG. 1.

Referring to FIG. 5, when an out-of-position occupant prevents the cushion 104 from fully expanding rearward of the steering wheel 110, the upper portion 118 of the cushion 104 inflates forward of the steering wheel 110 in a direction distal to the chin and the head of the out-of-position occupant. In particular, the inflatable cushion 104 has a rearward outer profile 120 and multiple vents 122 disposed radially inward of the rearward outer profile 120. Furthermore, as shown in FIG. 6, the diffuser 114 has a plurality of apertures 124 that are configured to direct gas in a plurality of directions. The out-of-position occupant may deform the cushion 104 so as to dispose or align the vents 122 along at least a portion of these directions, and thus exhaust sufficient gas from the cushion 104 so as to deploy the upper portion 118 of the cushion 104 forward of the steering wheel 110.

Figure 7:
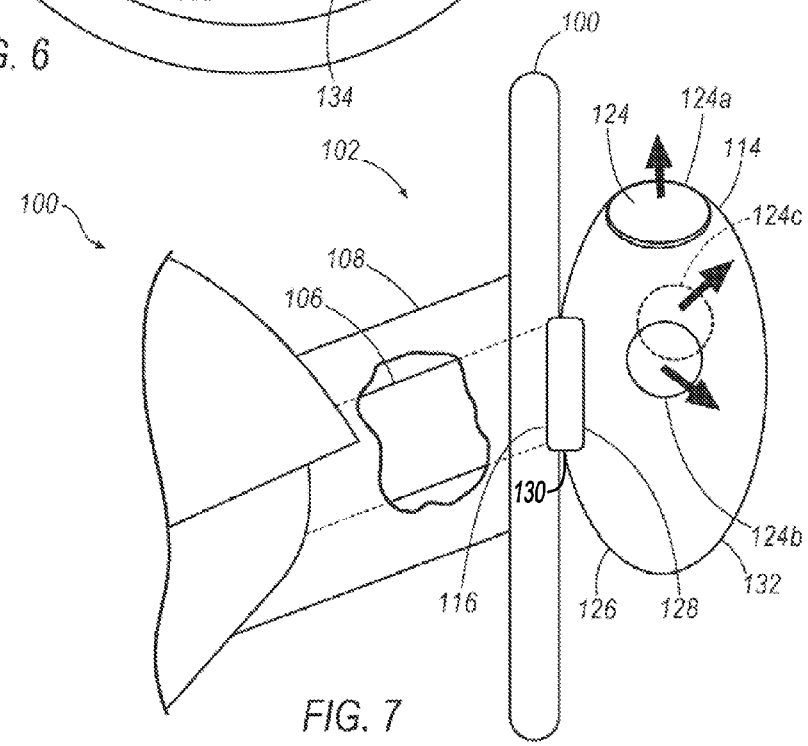
FIG. 7 is a side view of the diffuser of FIG. 6, showing the diffuser being pressurized to direct gas into the main cushion.

Referring to FIGS. 6 and 7, the diffuser 114 can include a forward panel 126 that defines an inlet 128, which in this form is disposed at a center portion 130 of the forward panel 126. However, the inlet 128 may defined by other portions of the diffuser 114. The diffuser 114 may also have a rear panel 132 and a plurality of spaced apart seams 134 that interconnect the rearward and forward panels 126, 132 and also define the apertures 124. The seams 134 can include a semicircular seam 136, which directs gas from the inlet 128 through the apertures 124 and to the upper portion 118 of the chamber 112. In this respect, the diffuser 114 can reduce the punch-out force that the cushion 104 may otherwise apply directly rearward to the occupant's chest. The seams 134 can further include one or more linear segments 138, 140, which define an upper aperture 124a and further cooperate with the semicircular seam 136 to define a pair of lateral apertures 124b, 124c that are arranged diametrically opposite to one another. In this respect, an out-of-position occupant may contact the cushion 104 so as to align the apertures 124 and the vents 122 in a configuration that exhausts gas to deploy the cushion forward of the steering wheel 110.

Referring again to FIG. 5, the vents 122 on the cushion 104 may be spaced apart from the shroud 108 and provide clearance therefrom to permit gas to exit the cushion 104 when the occupant impacts the cushion 104. In this respect, gas may exit the cushion 104 and reduce loading forces on the occupant's head, chin and chest, when the cushion 104 is deployed forward or rearward of the steering wheel 110.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A driver airbag module, comprising:
    an inflator;
    a cushion defining a vent on a side adjacent a steering wheel when inflated; and
    a fabric diffuser disposed within the cushion, including a forward panel defining an inlet at a center portion of the forward panel interconnected to a rearward panel via a plurality of spaced apart, semicircular seams having at least one linear segment, and defining an aperture between the spaced apart seams and including a pair of lateral apertures arranged diametrically opposite to one another configured to direct gas from the inflator toward the vent such that, upon occupant impact with the cushion, the side including the vent deploys through and forward of the steering wheel wherein the semicircular seam directs gas flowing from the inlet of the fabric diffuser and through the aperture directly to an upper portion of the cushion.

2. The driver airbag module of claim 1 wherein the aperture of the diffuser is configured to direct gas in a plurality of directions, and the vent on the cushion is disposed along at least a portion of the directions.

3. A passenger restraint system for a vehicle, comprising:
    a steering wheel; and
    an airbag module including a cushion defining a vent on a side adjacent to the steering wheel when inflated and a fabric diffuser disposed within the cushion, including a forward panel defining an inlet at a center portion of the forward panel interconnected to a rearward panel via a plurality of spaced apart, semicircular seams having at least one linear segment, and defining an aperture between the spaced apart seams and including a pair of lateral apertures arranged diametrically opposite to one another configured to direct gas from the inflator toward the vent such that, upon occupant impact with the cushion, the side including the vent deploys through and forward of the steering wheel wherein the semicircular seam directs gas flowing from the inlet of the fabric diffuser and through the aperture directly to an upper portion of the cushion.

4. The passenger restraint system of claim 3 wherein the aperture of the diffuser is configured to direct gas in a plurality of directions, and the vent on the cushion is disposed along at least a portion of the directions.

5. The passenger restraint system of claim 3 wherein the vent on the cushion is spaced apart from the steering wheel to permit gas to exit the cushion when a portion of cushion is deployed forward of the steering wheel.

6. An airbag, comprising:
    a cushion defining a vent on a side; and
    a fabric diffuser within the cushion, including a forward panel defining a center inlet, interconnected to a rearward panel via spaced-apart, semicircular seams having a linear segment directing gas from the inlet through diametrically-opposite, paired-lateral apertures defined between the seams, to an upper cushion portion toward the vent wherein a cushion impact deploys the side through and forward a steering wheel.

* * * * *